(12) United States Patent
Rogers et al.

(10) Patent No.: US 7,458,102 B2
(45) Date of Patent: Nov. 25, 2008

(54) INFORMATION SECURITY ARCHITECTURE FOR REMOTE ACCESS CONTROL USING NON-BIDIRECTIONAL PROTOCOLS

(75) Inventors: Allen Rogers, Hudson, MA (US); Allen Douglas Hadden, Marlborough, MA (US); Timothy Neil Norman, Millis, MA (US)

(73) Assignee: EMC Corporation, Hopkinton, MA (US)

( * ) Notice: Subject to any disclaimer, the term of this patent is extended or adjusted under 35 U.S.C. 154(b) by 622 days.

(21) Appl. No.: 10/919,300

(22) Filed: Aug. 17, 2004

(65) Prior Publication Data

US 2006/0041751 A1  Feb. 23, 2006

(51) Int. Cl.
*G06F 11/30* (2006.01)
*G06F 12/14* (2006.01)
*H04L 9/32* (2006.01)

(52) U.S. Cl. .................... 726/30; 713/158; 713/161; 713/165; 713/185

(58) Field of Classification Search .............. None
See application file for complete search history.

(56) References Cited

U.S. PATENT DOCUMENTS

| | | | |
|---|---|---|---|
| 4,605,820 A | 8/1986 | Campbell, Jr. |
| 4,803,108 A | 2/1989 | Leuchten et al. |
| 4,937,863 A | 6/1990 | Robert et al. |
| 5,058,164 A | 10/1991 | Elmer et al. |
| 5,098,124 A | 3/1992 | Breed et al. |
| 5,263,157 A | 11/1993 | Janis |
| 5,349,893 A | 9/1994 | Dunn |
| 5,356,177 A | 10/1994 | Weller |
| 5,410,598 A | 4/1995 | Shear |
| 5,432,849 A | 7/1995 | Johnson et al. |
| 5,438,508 A | 8/1995 | Wyman |
| 5,440,631 A | 8/1995 | Akiyama et al. |
| 5,509,070 A | 4/1996 | Schull |
| 5,586,186 A | 12/1996 | Yuval et al. |
| 5,629,980 A | 5/1997 | Stefik et al. |
| 5,673,316 A | 9/1997 | Auerbach et al. |
| 5,689,560 A | 11/1997 | Cooper et al. |
| 5,708,709 A | 1/1998 | Rose |
| 5,727,065 A | 3/1998 | Dillon |
| 5,754,646 A | 5/1998 | Williams et al. |
| 5,765,152 A | 6/1998 | Erickson |
| 5,796,825 A | 8/1998 | McDonnal et al. |
| 5,809,145 A | 9/1998 | Slik et al. |
| 5,818,936 A | 10/1998 | Mashayekhi |
| 5,822,524 A | 10/1998 | Chen et al. |
| 5,883,955 A | 3/1999 | Ronning |
| 5,933,498 A | 8/1999 | Schneck et al. |
| 5,956,034 A | 9/1999 | Sachs et al. |

(Continued)

*Primary Examiner*—Christian LaForgia
(74) *Attorney, Agent, or Firm*—Steptoe & Johnson LLP (57) ABSTRACT

A system and method of controlling distribution of electronic information to a device through a non-bidirectional protocol is disclosed. At a user device, a segment of encrypted electronic information is retrieved. Identification data is sent from the user device using the non-bidirectional communications protocol, where the identification information includes at least one of information associated with a user, information associated with the user device, or information associated with the segment of encrypted electronic information. A copy of an encryption key for the segment is retrieved. A voucher is forwarded to the user device using the non-bidirectional communications protocol, the voucher including at least the encryption key associated with the segment. At the user device, the segment is decrypted using the encryption key for the segment.

24 Claims, 4 Drawing Sheets

U.S. PATENT DOCUMENTS

| | | | |
|---|---|---|---|
| 5,997,077 A | 12/1999 | Siebels et al. | |
| 6,002,772 A | 12/1999 | Saito et al. | |
| 6,064,736 A | 5/2000 | Davis et al. | |
| 6,182,220 B1 | 1/2001 | Chen et al. | |
| 6,245,408 B1 | 6/2001 | Bitzer | |
| 6,289,450 B1 * | 9/2001 | Pensak et al. | 713/167 |
| 6,308,256 B1 | 10/2001 | Folmsbee | |
| 6,339,825 B2 * | 1/2002 | Pensak et al. | 713/158 |
| 6,449,721 B1 * | 9/2002 | Pensak et al. | 713/171 |
| 6,499,106 B1 | 12/2002 | Yaegashi et al. | |
| 6,547,280 B1 | 4/2003 | Ashmead | |
| 6,682,128 B2 | 1/2004 | Carroll et al. | |
| 6,711,553 B1 | 3/2004 | Deng et al. | |
| 6,732,106 B2 | 5/2004 | Okamoto et al. | |
| 6,978,376 B2 * | 12/2005 | Giroux et al. | 713/189 |
| 2001/0052074 A1 * | 12/2001 | Pensak et al. | 713/167 |
| 2001/0055396 A1 | 12/2001 | Jevans | |
| 2002/0026500 A1 * | 2/2002 | Kanefsky et al. | 709/219 |
| 2002/0029340 A1 * | 3/2002 | Pensak et al. | 713/182 |
| 2002/0078361 A1 * | 6/2002 | Giroux et al. | 713/183 |

* cited by examiner

INFORMATION SECURITY ARCHITECTURE FOR REMOTE ACCESS CONTROL USING NON-BIDIRECTIONAL PROTOCOLS

BACKGROUND

The present invention relates to an electronic security system for electronic objects that can be transmitted using non-bidirectional communication protocols. More specifically, the present invention is directed to protecting that information, providing controlled access to the information by authorized users, controlling what authorized users they can do with the information and dynamically changing or revoking a given users access and/or use rights.

This functionality has been developed for networked computers that can establish bi-directional connections that allow the client applications to interact directly with policy servers in real-time (such as over an IP network). However, in switched messaging networks there is no concept of connections over which a client application and a policy server can have a bidirectional conversation of associated packets. Rather, they can only send independent messages with no guarantee of delivery time or way to associate response messages with request messages. Systems that utilize IP network protocols cannot be used in this environment. A need therefore exists to provide such secure measures in a non-bidirectional protocol environment.

SUMMARY

The preferred embodiment(s) of the invention are summarized here to highlight and introduce some aspects of the present invention. Simplifications and omissions may be made in this summary. Such simplifications and omissions are not intended to limit the scope of the invention.

According to an embodiment of the invention, a method of controlling distribution of electronic information using a non-bidirectional communications protocol is disclosed. At a user device, a segment of encrypted electronic information is retrieved. Identification data is sent from the user device using the non-bidirectional communications protocol, where the identification information includes at least one of information associated with a user, information associated with the user device, or information associated with the segment of encrypted electronic information. A copy of an encryption key for the segment is retrieved. A voucher is forwarded to the user device using the non-bidirectional communications protocol, the voucher including at least the encryption key associated with the segment. At the user device, the segment is decrypted using the encryption key for the segment.

The above embodiment preferably has one or more optional features. The voucher can be encrypted before being forwarded using an encryption key that is unique to at least one of the user device or the user. At the user device, the voucher can be encrypted using the encryption key that is unique to at least one of the user device or the user, to thereby access the encryption key for the segment. The voucher may include at least one policy constraint and/or a validity period. The voucher would expire after the validity period.

According to another embodiment of the invention, a method of controlling distribution of electronic information is provided. The method includes receiving identification information using a non-bidirectional communications protocol, the identification information including at least information associated with a user, a user device, and a segment of encrypted electronic information. A copy of an encryption key for the segment is retrieved. A voucher is prepared, the voucher including at least an encryption key for decrypting the segment, and a validity period. The voucher is encrypted using a key specific to at least the user device. The voucher is sent using the non-bidirectional communications protocol.

The above embodiment preferably has one or more optional features. The voucher is encrypted with an encryption key that is unique to at least one of a user device or a user, the method further comprising decrypting the voucher. The voucher includes at least one policy constraint and/or at least a validity period. The voucher would expire after the validity period.

According to yet another embodiment of the invention, a system for controlling distribution of electronic information to user device is provided. The user device is configured to access a segment of encrypted electronic information and to send identification data to a remote site using a non-bidirectional communications protocol, the identification information including at least one of information associated with a user, information associated with the user device, or information associated with the segment of encrypted electronic information. A remote site includes at least one server configured to retrieve a copy of an encryption key for the segment and forward a voucher to the user device using the non-bidirectional communications protocol, wherein the voucher includes at least the encryption key associated with the segment. The user device is configured to receive the voucher and decrypt the segment using the encryption key for the segment.

The above embodiment preferably has one or more optional features. The at least one server can be configured to encrypting the voucher using an encryption key that is unique to at least one of the user device or a specific user. The user device can be configured to decrypt the voucher using the encryption key that is unique to at least one of the user device or the user, to thereby access the encryption key for the segment. The voucher includes at least one policy constraint and/or a validity period. The voucher would expire after the validity period.

According to still yet another embodiment of the invention, a system of controlling distribution of electronic information is provided. At least one server is configured to receive identification information using the non-bidirectional communications protocol, the identification information including at least information associated with a user, a user device, and a segment of encrypted electronic information; retrieve a copy of an encryption key for the segment; prepare a voucher that includes at least an encryption key for decrypting the segment and a validity period; encrypt the voucher using a key specific to at least the user device; and forward the voucher using the non-bidirectional communications protocol.

The above embodiment preferably has one or more optional features. The voucher is encrypted with an encryption key that is unique to at least one of a user device or a user, and the at least one server is configured to decrypt the voucher. The voucher includes at least one policy constraint and/or a validity period. The voucher would expire after the validity period.

These and other objects will become apparent from the figures and written description contained herein.

BRIEF DESCRIPTION OF THE DRAWINGS

Preferred embodiment(s) of the invention will be discussed below with reference to attached drawings in which.

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
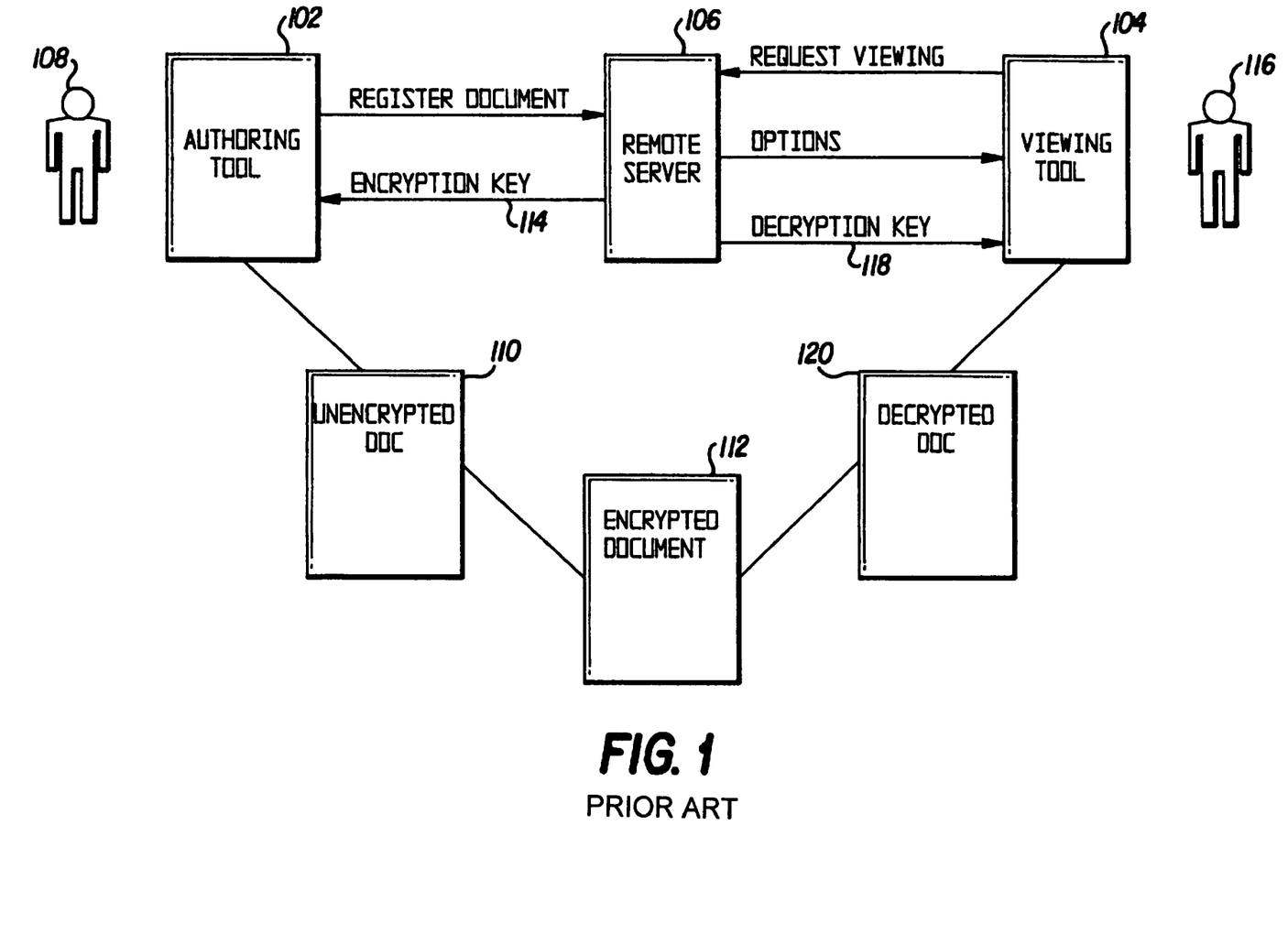
FIG. 1 is a block diagram illustrating a system configuration of an authoring tool, a viewing tool, and a remote server of the electronic encryption system.

Referring now to the Figures wherein like reference numerals indicate like elements, in FIG. 1, the system of the preferred embodiment can be broken down conceptually into three functional components: an authoring tool 102, a viewing tool 104, and a remote server 106. For convenience, the embodiments described herein are described with respect to a document in Adobe acrobat, but other embodiments using other base software packages are possible. Other types of electronic information, as determined by the base software package chosen, can be encrypted using the present invention.

The authoring tool 102 allows an authoring user 108 to convert an electronic document 110 to unreadable form 112 using a strong encryption algorithm and an encryption key, or set of encryption keys, provided by the remote server 106. As used herein, "encryption key" refers to the codes or information used for encryption or decryption of underlying information. The authoring tool 102 also registers the electronic document or information with the remote server 106 and associates a set of access policies with the encryption key so that only selected viewing users 116 under selected circumstances may view the document in clear format. The document or information may also be broken down into segments using the authoring tool 102, so that certain segments within a document may have different access policies. For example, a set of users may be allowed to view pages 1-5 of a 10-page document in clear format, while a subset of those users may be allowed to view all 10 pages of the document. The authoring tool 102 also allows the authoring user 108 to block certain functions normally accessible by the viewing user 116. For example, the authoring user 108 may deny a viewing user 116 privileges such as printing and copying of the clear format.

The viewing tool 104 allows a viewing user 116 to decrypt the document 112 an authoring user 108 has encrypted, provided the authoring user 108 has associated an access policy with the encryption key that grants access to the clear format to the viewing user 116. The viewing tool 104 retrieves the encryption key 118 associated with the document segment 112 from the remote server 106, decrypts the document segment into clear format, loads the clear format into the display buffers to render the document segment on a display, destroys the encryption key, and clears the display buffers to destroy the clear format version of the document segment. The viewing tool 104 prevents the saving of the encryption key or the clear format version of the document. The viewing tool 104 also blocks the viewing user's machine from performing certain functions, such as printing or copying, as directed by the authoring user 108 during registration of the document 110.

The secure remote server 106 performs several functions. The remote server 106 generates encryption keys 114 for each document segment, maintains encryption keys 118 for registered encrypted documents 112, authenticates requests for viewing a document segment, grants access to registered documents 112 by providing encryption keys 118 and associated access policies to authorized viewing users 116, and maintains an encrypted secure central database which provides association between registered authoring users, registered documents, associated encryption keys, associated policies for each document, options for each user and document, and associated registered viewing users. The remote server 106 does not store or receive the actual document, either encrypted or unencrypted.

Figure 2:
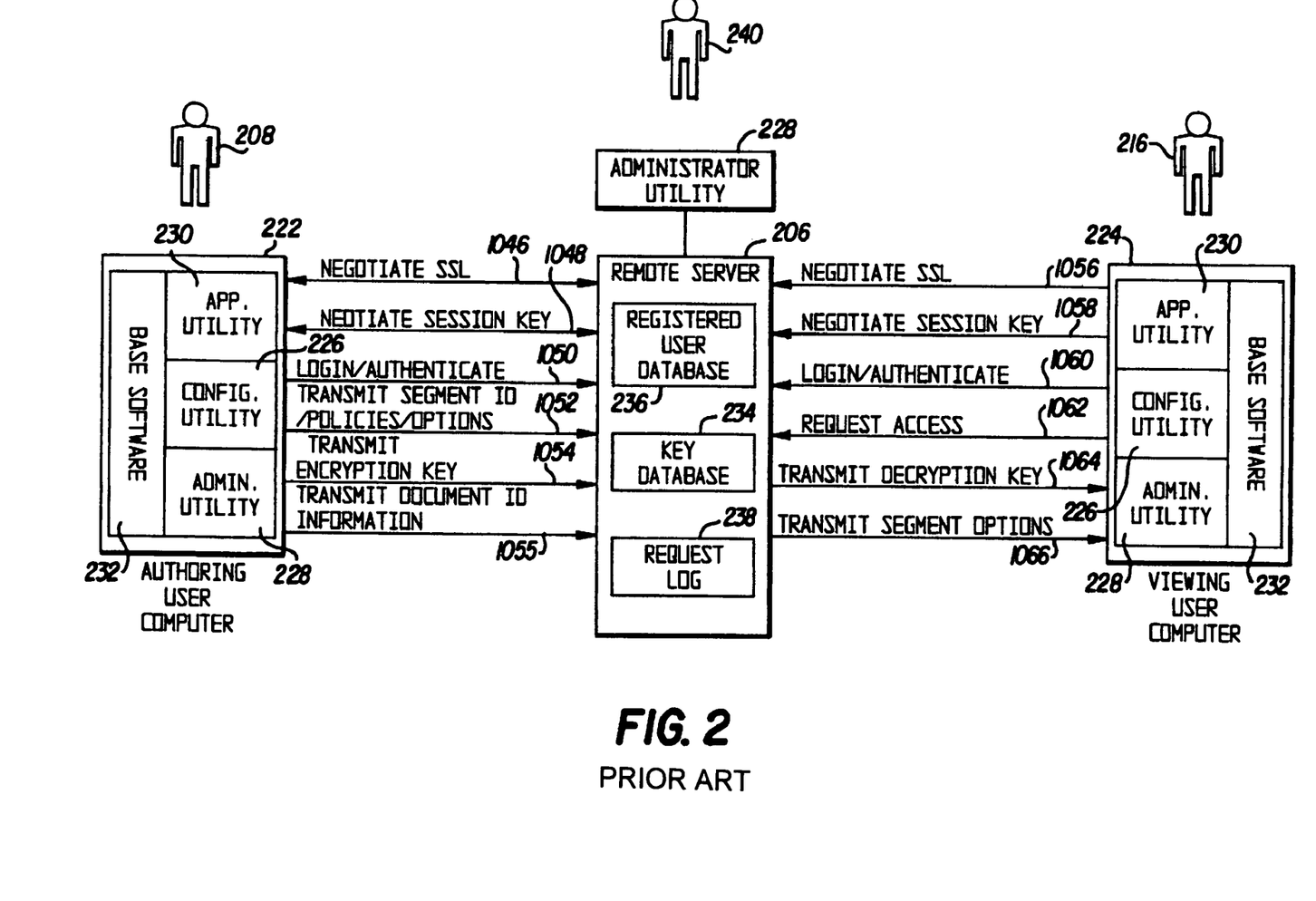
FIG. 2 is a block diagram illustrating a detailed system configuration and functions associated with each component of the electronic encryption system.

The authoring tool 102 and the viewing tool 104 each use essentially the same suite of software tools. As shown in FIG. 2, the software tools reside on the authoring and viewing users' computers 222, 224. Registration with the central remote server 206 determines which functions within the suite of software tools are available to a particular user. The software tools include a Configuration Utility 226, an Administrator Utility 228, and an Application Interface 230. In the embodiment using Adobe acrobat, the Application Interface is a "Plug-In," which uses SDK and Plug-In Standard Interface. The three software tools run in conjunction with base viewing or playback software 232, such as Adobe acrobat, a web browser, a word processor, an audio or video playing application, a custom data processing, or a specialized low-level device driver, such as a hard disk driver, video driver, or audio driver. The base software package 232 will depend on the type of data stream to be encrypted/decrypted.

The Secure Remote Server

The secure remote server 206 is a server that is remote from an authoring or viewing user 208, 216. The server 206 maintains a database 234 of encryption keys and associated encryption keys for distribution to registered or authorized users. The remote server 206 also maintains a database that associates registered document segments, which are identified by unique segment IDs, with authoring users, user access profiles, document access policies and options, and associated encryption/encryption keys. The remote server 206 does not actually store registered documents or segments, but instead relates identifying information about a document to the associated information.

The remote server 206 also tracks and maintains records of requests to view documents and to obtain document encryption keys 238. The records may be used to monitor the system for suspicious activity. For example, a single user requesting the encryption key for a document several times during a specific time period might be an indication of suspicious activity. The server can then provide an alert message to a pager, e-mail or fax, thus allowing timely investigation of the activity. The request information may also be used for the purposes of non-repudiation or as a basis for billing in situations where access to the system or access to protected information is being sold.

All communication between the remote server 206 and a user's computer 222, 224 is encrypted using Secure Socket Layer (SSL) protocols. Once an SSL tunnel has been negotiated between a user's machine 222, 224 and the secure server 206, a session key is negotiated. Thus, communications to and from the secure server 206 and a user's computer 222, 224 are doubly encrypted.

Registration with the remote server 206 of a user or automated system wishing to use the system is done separately from any communication for registering a document or viewing a document. A user wishing to register documents for viewing by other users, or viewing registered document registered by other users, must contact the server independently, possibly through a separate human Coordinator 240 or separate network link which can collect payment for the authoring, viewing, and other services, can verify the identity of the user and provide the server with user identification information and user authorization profiles.

The server may be a single server, a set of synchronized servers, or dual servers with a shared database.

The Configuration Utility

The Configuration Utility 226 defines a local user (authoring or viewing) on the user's computer 222, 224. The Configuration Utility 226 establishes the communication parameters for a local user and the remote server 206. For example, the Configuration Utility 226 will query the user to define a local user profile, to include name, password and other identifying information. This local user profile must match the information provided by a user to the Coordinator 240 at the remote server 206.

The Configuration Utility 226 is also responsible for maintaining information regarding the authentication and secure communication method used by the local user, for example, certificate, secret pass phrase, smart card, etc. The Configuration Utility 226 maintains information about the local user's secure communication method, for example, the certificate and certification authority for a certificate based secure communication system.

The Administrator Utility

The Administrator Utility 226 is a network client application used by the human Coordinator 240 and other users to control access to documents selected for encryption by defining policies associated with a document. The Administrator Utility 228 is a software program residing on the user's computer 222, 224. The Coordinator 240 or authoring user 208 uses the Administrator Utility 228 to define policies related to a particular user. For example, the Coordinator 240 can use the Administrator Utility 228 to control the functions available to a particular authoring user 208, which might depend on the fees paid by the authoring user 208, or the Coordinator 240 can control the amount of access an authoring user 208 can allow to viewing users 216. Other policies that an individual can define using the Administrator Utility 228 are site policies, group policies, and default policies.

The Administrator Utility 228 allows the Coordinator 240 or authoring or viewing user 208, 216 to determine what documents have been registered by a particular user by accessing the registered user database 236. The Administrator Utility 228 also allows an authoring user to permanently disable the viewing of documents by deleting the associated encryption key from the server. The Administrator Utility 228 also allows an authoring user 208 to initially define the policies related to his documents and to change the policies after the documents have initially been registered.

The Administrator Utility 228 allows a normal authoring user 208 to create, edit, and delete time windows, network specifications and policy templates; view the list of registered documents; and view and edit the policies of documents that are registered. The Administrator Utility 228 allows the Coordinator 240 to create, edit, and delete users and user policies; create, edit, and delete groups of users and group polices; create, edit, and delete document groups and document group policies; define and modify the Site and Default polices; create, edit, and delete document override policies; and view the activity log and set up notification policies

The Application Interface

The Application Interface 230 of the preferred embodiment is a standard "Plug-In" to Adobe acrobat using SDK and Plug-In Standard Interface. The Plug-In 230 provides a user screen interface to allow the user to access the particular functions associated with registering and viewing documents and communicating with the server. The Plug-In Screen may be integral to the Adobe User Interface Window or may be a separate window. In the preferred embodiment, the Plug-In 230 modifies the Adobe User Interface Window by adding functional "buttons" such as register, create policies, tag, encrypt, view and decrypt.

The Plug-In 230 allows encryption and decryption of PDF files using encryption keys from the remote server 206. The Plug-In 230 connects to the server 206, authenticates the user to the server, registers documents with the server, and selects policies at the server as they have been defined by the authoring user 208 using the Administrator Utility 228.

In addition, the Plug-In 230 blocks certain functions at the viewing user's computer 224 that are otherwise available in Adobe acrobat. For example, if the authoring user 208 has limited access to a document so that a viewing user 216 is prohibited from printing a viewed document, the Plug-In 230 temporarily disables the print function of Adobe acrobat. Among the functions that the Plug-In 230 can disable are print, copy, cut, paste, save, and other functions. Other functions may be disabled or limited as appropriate for the type of file viewed and the access level. The Application Interface 230 is designed in such a way that it does not disclose either the encryption key or the clear format or unencrypted representation of the protected information content in electronic form.

The Graphical User Interface

The Graphical User Interface ("GUI") supports standard user interface objects such as push buttons, text input fields, lists, menus, and message boxes. The GUI is controlled by the mouse and keypad. The GUI has multiple windows that allow real time setup of server configuration such as who may register a document, who may view a document, when a document may be viewed and on which host the document key and viewing information resides.

Initial User Setup

A user who wishes to register or to access information must first register and be recognized by the server 206. The user 208, 216 contacts the server 206 independently, possibly through a separate human Coordinator 240 or separate network link which can collect payment for the authoring, viewing and other services; verify the identity of the user; and provide the server with user identification information and user authorization profiles. Once the user 208, 216 is registered with the server 206, the suite of software tools is provided to the user.

The user must have installed the base software 230, such as Adobe acrobat, on his computer. The user then installs the Application Interface 230 provided by the Coordinator 240, as well as the Administrator and Configuration Utilities 228, 226. In one embodiment, upon running the Application Interface 230, the Application Interface 230 will install the Administrator and Configuration Utilities 228, 226 on the user's machine. There is no network activity involved in the installation of the Application Interface 230, Administrator, or Configuration Utilities 228, 226.

Creating Policies Using the Administrator

Once a user 208, 216 is registered and the Configuration Utility 226 has set up identification and encryption information for the user 208, 216, the user authorized to do so can use the Administrator Utility 228 to create policies associated with a specific document. An authoring user 208 wishing to register a document creates policies to define who, when and how a document may be viewed or otherwise accessed.

The authoring user 208 runs the Administrator Utility 228 that has been installed on his machine 222 and instructs the Administrator Utility 228 to create policies for a document. The Administrator Utility 228 will request the information provided during set up to the Configuration Utility 226 such as username, pass phrase, and method of authentication to verify the user's identity. The Administrator Utility 228 will also ask on which server the authoring user 208 wishes to register his document. The Administrator Utility 228 will then establish a connection to the remote server through the Application Interface 230.

The remote server 206 and the authoring or viewing user's computer 222, 224 communicating with the server 206 will negotiate a standard Secure Socket Layer (SSL) encryption tunnel, as represented in FIG. 2 by reference numerals 1046, 1056.

Once the SSL tunnel is established, the user's computer 222, 224 and the server 206 negotiate a secondary session key, as represented in FIG. 2 by reference numerals 1048, 1058. All subsequent communications is additionally encrypted using 256-bit AES and this secondary session key. All communication between the users' computers 222, 224 and the server 206 is thus doubly encrypted.

Once the doubly encrypted communication link is established between the authoring user's computer 222 and the server 206, the authoring user's computer 222 provides login and authentication information 1050 to the server 206. The server 206 authenticates the authoring user's 208 identity and verifies that the authoring user 208 has authority to use the system by checking a database of registered users 236 maintained on the server. The information provided by the authoring user 208 to the Configuration Utility 226 is compared to the information provided by the user to the Coordinator 240 during the independent user registration process 1042, 1044. The database 234 contains all of the access controls related to a particular user, so that if a user is only authorized to view documents, he will not be allowed to use the system to register or encrypt documents.

After the server 206 authenticates the authoring user 208 and verifies that the authoring user 208 is authorized to register documents, the Administrator Utility 228 allows the authoring user 208 to create policies applicable to a particular viewing user 216, a group of viewing users, or a default policy for all other users. The policies 1052 are then communicated to the server 206. Policies define who may view a document, when, and under what conditions. Policies are created by combining a set of constraints including allowable or denied users and groups, time ranges, and Internet Protocol (IP) addresses. Access to a document by a viewing user 216 is determined by combining the user policy, document policy, as well as possibly the group policy and document group policy. If the Coordinator 240 has created a document override policy for a document, then the override takes precedence over the regular document policy defined by the authoring user. Policies include limiting who may view a document or portion of a document and the time frame during which a user may view the document.

The Administrator Utility 228 also allows the authoring user 208 to create options.

Options specify what functions of the base software 232 are temporarily disabled so that the viewing user 216 is prohibited from accessing them while viewing the document. An option can also enforce a watermark on printing. For example, the authoring user 208 can prohibit a particular viewing user 216 from printing, saving, or copying a particular document or portion of a document. These Options are defined by the authoring user 208 using the Administrator Utility 228, but the options are enforced by the Application Interface 230.

Encrypting Documents and Data Streams

An authoring user 208 wishing to encrypt a document will open the document on his computer 222. The Application Interface 230 must also be loaded before the document or information can be encrypted. In the preferred embodiment, the Plug-In 230 adds menu items to the menu bar in Adobe acrobat such as "tag" and "encrypt." "Tag" allows the authoring user 208 to select segments of the document to be encrypted. The authoring user 208 can assign different policies to different tagged segments of a single document, i.e., policies are associated with segments. A segment may consist of any subset of the entire document or the entire document. Once the document has been segmented or "tagged," the authoring user selects "encrypt" from the menu bar. If the authoring user 208 has not already logged into the remote server 206, the Plug-In 230 will force a log in to the remote server 206 through the Administrator Utility 228. A login screen is provided and the authoring user 208 must login to the server 206. The server 206 authenticates the authoring user 208 and verifies that the authoring user 208 is authorized to register documents.

Once the authoring user has been authenticated, the authoring user is asked to associate the overall document with a policy, and this information is communicated to the remote server 236. This policy becomes the default policy for any portions of the document that are not tagged and associated with a specific policy. The Plug-In 230 assigns a unique segment ID for each tagged segment after the authoring user has tagged all segments and has instructed the Plug-In 230 to go ahead with the encryption. The Plug-In 230 transmits the segment IDs to the server 206. The server 206 generates a random encryption key for each segment ID and communicates the encryption key to the authoring user's computer 222, 1054. The server 206 stores the segment ID, the key associated with the particular segment ID, and the policy associated with a particular segment ID in the central database 234, and then transmits the key to the Plug-In 230 at the authoring user's computer 222. The Plug-In 230 at the authoring user's computer 222 encrypts the segment, immediately destroys or removes the key from the authoring user's Machine 222, and then deletes the clear format for the segment from the Plug-In 230. Thus, key lifetime is very short on the authoring user's machine. The encryption key is never stored on the authoring user's machine where it is accessible, such as the hard disk. The key can even be obfuscated while in the memory of the authoring user's machine. The duration of the key's existence depends on the speed of the computer that actually performs the encryption, since the key is destroyed immediately after the encryption. In the preferred embodiment, 256-bit AES is used for document and segment encryption.

Once all segments have been encrypted, the Plug-In 230 produces a hash of the entire document and sends the hash to the server as document identification, 1055. The server 206 stores the hash with the keys associated with the document. Thus, the document is never transmitted to the server 206, only the segment IDs and hash.

A pop-up window asks the authoring user 208 where he wishes to store the encrypted document. By default, the encrypted document overwrites the clear format document on the authoring user's machine 222.

Viewing, Replaying, and Decrypting

A user wishing to view a document must have installed the Configuration Utility 226, Administrator Utility 228, and the Application Interface 230 on his computer 224. The viewing user 216 must be independently registered with the Coordinator 240 as a user. The viewing user 216 must also have installed the base software application 232 for viewing the document, such as Adobe acrobat. The viewing user 216 must enter the Configuration Utility 226 and provide user set up information.

If the viewing user 216 has not opened the Configuration Utility 226, the Administrator Utility 228 and the Application Interface 230, these programs will automatically be opened once the information to be accessed has been selected, and the system has recognized that the information is encrypted.

Once the Configuration Utility 226 has opened, it will request the user to provide information defining the viewing user 216 and/or the viewing user's computer 224. If the viewing user 216 is a new user, the viewing user 216 will select a button on the Configuration Utility's interface window indicating that a new user profile needs to be provided. The Configuration Utility 226 will provide a query screen to the user and the user will input identification information, such as a user name. The identification information will be checked against the information provided to the server 206 or Coordinator 240 during the independent user registration process.

The Application Interface 230 will check to see if the user is logged onto the remote server 206. If the viewing user 216 has not logged onto the remote server, the Application Interface 230 provides a pop-up window so that the user can log in to the server. An SSL tunnel and session key are negotiated, 1056, 1058. The viewing user's computer 224 provides login and authentication information to the server 206, 1060. Once logged into the server 206, the Application Interface 230 requests access to the document or information 1062 by asking the server 206 for the encryption key for the first segment of the document or information to be accessed. The server 206 uses the segment ID to check the database to find the policies associated with the segment and thus to determine whether the viewing user 216 is authorized to access this segment or the document as a whole.

If the viewing user 216 is not authorized to access the segment, the viewing user 216 is so informed. If the user 216 is authorized to access the segment, the server 206 sends the encryption key and options for that segment to the Application Interface 230 at the viewing user's computer 224 and the Application Interface 230 decrypts the segment using the encryption key. After decrypting the segment, the Application Interface 230 immediately discards/destroys the key, loads the decrypted segment into the display buffers to renders the decrypted segment to the screen, and then clears the buffers to destroy the decrypted version of the segment. When the viewing user moves to a different segment, the process is repeated.

The Application Interface 230 enforces the options that were assigned by the authoring user 230 to the segment viewed by the viewing user 216. For example, if the authoring user 208 assigned that the viewing user 216 cannot print the clear format document or segment, then the Plug-In 230 disables the print function of Adobe acrobat while the clear format document or segment is available to the viewing user 216. Other functions that can be controlled or disabled by the Plug-In 230 are save, copy, paste, and print with watermark. For other base software packages such as audio 230, the functions controlled by the Application Interface 230 could be play, copy, and save unencrypted. Thus, using the options, the viewing user 216 has no ability to permanently acquire the clear format document or data.

The Database

The secure central database 234 resides on the remote server 206. It may be a distributed or shared database residing on multiple remote servers 206. In the preferred embodiment, the database 234 is maintained in a commercially relational database, such as Oracle. All sensitive records maintained in the central database 234 are preferably encrypted and the database is password protected. The Coordinator 240 controls the database 234 and has access to the database 234 using the password.

All keys for encryption and decryption are maintained in the database 234. The database 234 provides a structure for associating segment IDs with an associated encryption key, policies for accessing that segment, and options for accessing that segment. The authoring user 208 may change a policy associated with a segment ID through the Administrator Utility 228 on his computer. The change in policy is communicated to the remote server 206 and the database 234 is updated accordingly. The update policy function allows an authoring user 208 to revoke access to a segment or document by a user or group of users.

The authoring user 208 can destroy the encryption key or the association of an encryption key to a segment or document on the database 234 using the Administrator Utility 228. By destroying the encryption key or the association of the encryption key with a Segment or Document, the authoring user 208 destroys the ability to decrypt the information, effectively shredding all copies of the information.

The authoring user may also authorize the remote server to destroy the key after the expiration of a predetermined time, thereby placing a limited lifespan on the associated document. When the remote server destroys the keys after the predetermined time, all copies of the associated document becomes permanently inaccessible absent accessing of the underlying encryption algorithms. This feature prevents old backup copies of the document from unexpectedly emerging at a later date.

Regular backups of the database 234 can be made without shutting down the whole database 234.

Remote Access

Figure 4:
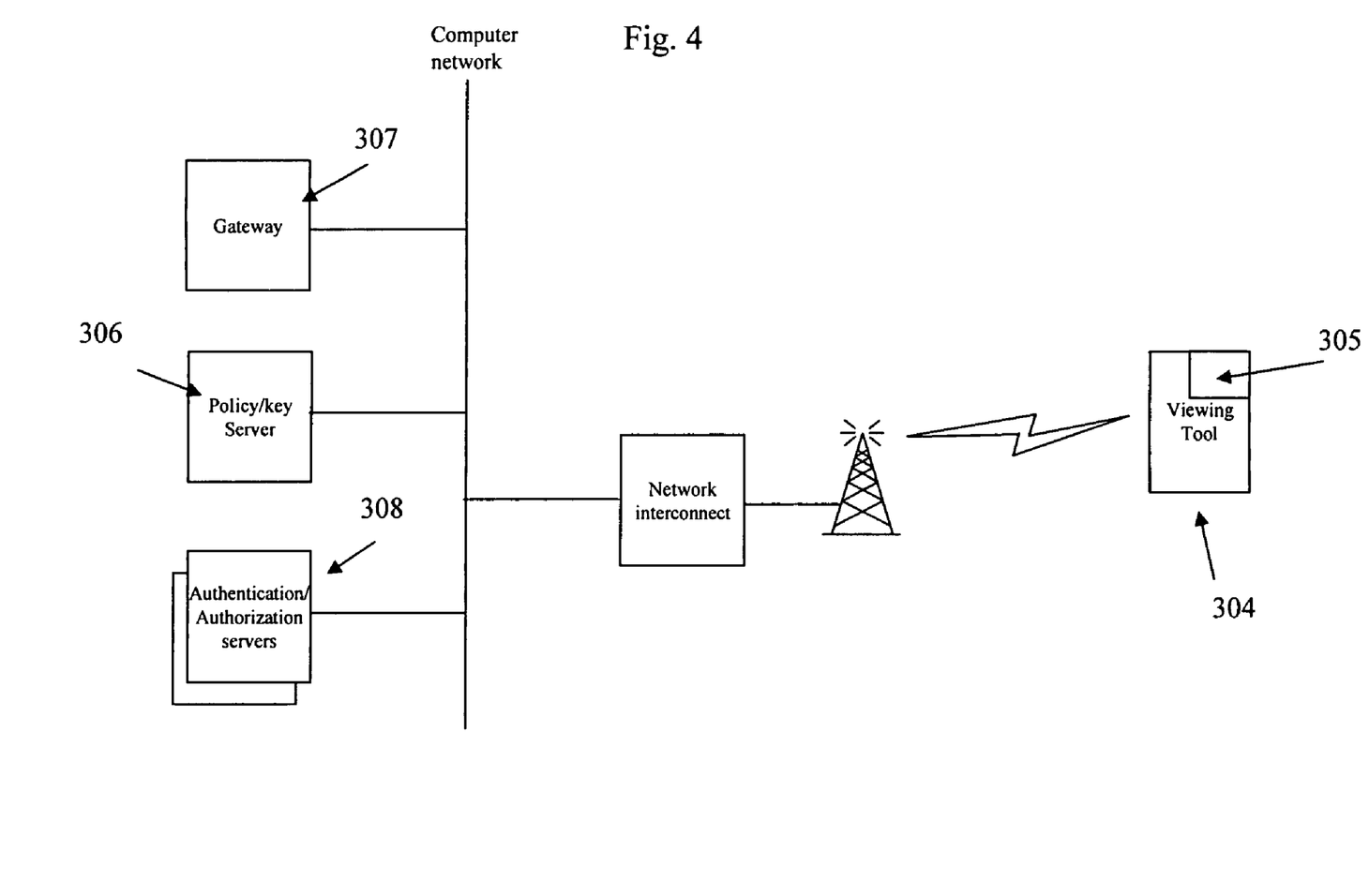
FIG. 4 is a block diagram illustrating a detailed system configuration associated with a non-limiting wireless implementation of the electronic encryption system for use in a non-bidirectional communications protocol environment.

Referring now to FIG. 4, user 216 preferably connects to the remote server to receive the keys to decrypt documents. However, if user 216 is unable to connect directly to the server (e.g., when travelling on a plane), then remote server 206 can "lease" keys through a remote access program 2000 in user computer 224. Remote access program 2000 is preferably part of Administrative Utility 228, although it may be completely or partially part of other utilities. To obtain a lease 2002, the user 216 enters a lease request at user computer 224 for a document. The user request preferably specifies a preferred time period for the lease. The user may also enter a reason for the request.

On receipt of the request, the user computer 224 generates a key unique to itself. The key may be provided through a number of different ways, including by way of non-limiting example utilizing components in computer 224 (e.g., machine ID, network card, etc) or by simply accessing the key from memory. The user computer 224 then encrypts the key in a manner that prevents reverse engineering, and sends the encrypted key along with the lease request to the remote server 206.

The remote server 206 then determines whether it can issue a lease. Non-limiting examples of reasons that remote server 206 may decline to issue a lease are: the particular remote server does not allow for leases; the user does not have either authorization to view this document or authorization to lease any documents; the document is not authorized for leasing; and/or the reasons for leasing are not valid for this document, user, or server. The foregoing limitations may be based on the policies associated with a particular remote server 206, an access limitation associated with the document for which the lease is requested, and/or an access limitation associated with particular user.

If the remote server 206 authorizes the lease, then it will generate a voucher that includes the requested keys and policy access for the document associated with the lease, as well as a time frame over which the lease is valid.

The time frame is preferably the smaller of the requested time frame, or a maximum time frame allowed for the particular user, document, or server. However, the invention is not so limited, and other time frames as appropriate may be used.

The selected keys are those keys requested by the lease for which the user is entitled access to. If a user is not entitled to access one or more of the requested keys, then such keys are preferably not included in the voucher.

The access policies are those that have been associated with the document for which the lease is requested. As set forth more fully above, such access policies may have been entered during the creation of the document, or amended sometime thereafter. Preferably, only the author, the system administrator, or some other authorized individual could either create or amend such access policies.

Remote server 206 then utilizes a protection function to protect the voucher. In a preferred embodiment of the invention, this protection function is a standard encryption algorithm, such as AES, for which the encryption key is derived from the lease key and other information ("a derived key"). Preferably, this random information includes a random number and a random hash table. However, the invention it no so limited, as other types of protection functions and encryption techniques may be used.

When the voucher is protected, the remote server 206 signs the encrypted voucher and sends it to user computer 224. Remote server 206 also sends sufficient information for user computer to generate the derived key. In the preferred embodiment, this includes the random hash table and the random number, which the user computer can combine with its lease key to generate the derived key. However, the invention is not so limited, as other information may be sent and used by the user computer to access the protected voucher. Remote access program 2000 stores the information, while remote server 206 logs the lease generation. User computer 224 may also verify the signature of the voucher before accepting the same.

When a user requests access to an encrypted document, the user computer 224 determines whether use computer 224 is logged onto either remote server 206 or remote access program 2000. In the absence of such a connection, the user computer 224 will attempt to log onto remote server 224, and operate as set forth above if successful. If unsuccessful, user computer will log onto remote access program 2000. The system then performs a security check to confirm that the plug-ins are trusted, and will abort the procedure if they are not.

The user then requests access to a segment (i.e., a document or portion thereof). Application Interface 230 requests access to the document by asking the remote access program 2000 for the encryption key for the segment. The program 2000 uses the segment ID to identify the associated voucher. To the extent that the user computer 224 has not previously verified the signature on the voucher, it preferably verifies the signature at this time.

Remote access program then generates the derived key and decrypts at least the policies and time frame of the voucher, and preferably the entire voucher. Based on the contents of the voucher, user computer 224 determines whether the user has access to the segment. By way of non-limiting example, the user may not granted access due to the absence of the key, violation of the access policies, and/or the request comes outside of the allotted time frame. The user computer 224 advises the viewing user 216 if authorization is lacking.

If the user 216 is authorized to access the segment, the system decrypts the encryption key (if it has not already done so), and the Application Interface 230 decrypts the segment using the encryption key. After decrypting the segment, the Application Interface 230 immediately discards/destroys the decrypted voucher and encryption key, loads the decrypted segment into the display buffers to renders the decrypted segment to the screen, and then clears the buffers to destroy the decrypted version of the segment. This process repeats everytime the viewing user moves to a different segment.

The Application Interface 230 enforces the options that were assigned by the authoring user 230 to the segment viewed or accessed by the viewing user 216. For example, if the authoring user 208 assigned that the viewing user 216 cannot print the clear format document or segment, then the Plug-In 230 disables the print function of Adobe acrobat while the clear format document or segment is available to the viewing user 216. Other functions that can be controlled or disabled by the Plug-In 230 are save, copy, paste, and print with watermark. For other base software packages such as audio 230, the functions controlled by the Application Interface 230 could be play, copy, and save unencrypted. Thus, using the options, the viewing user 216 has no ability to permanently acquire the clear format document or data.

Remote access program 2000 logs the above actions to create a record for later study. When the system later reconnects to remote server 206, program 2000 uploads these logs into a master database.

Access In The Absence Of a Bi-Direction Pathway

A bidirectional communication protocol is one in which a "virtual connection" can be established between two applications separated by a network. The concept of a virtual connection means that packets of information can be sent in both directions and, although individual packets my not arrive at the recipient in proper order, the protocol supports the concept of associating the individual packets with a particular virtual connection, reorganizing them in the proper order and dealing with lost packets. Another aspect of a bidirectional communication protocol is that packets can be sent from one application, received by another application and a response received back at the first application with a small enough latency to simulate a real-time interaction from a human users perspective.

In contrast, a non-bidirectional protocol either does not support the concept of a virtual connection, or the latency of communicating over the network is great enough such that it cannot support what is perceived as a real-time interaction between two applications from a human users perspective. A non-limiting example of a non-bidirectional protocol is the DataTAC network used by BLACKBERRY.

Figure 3:
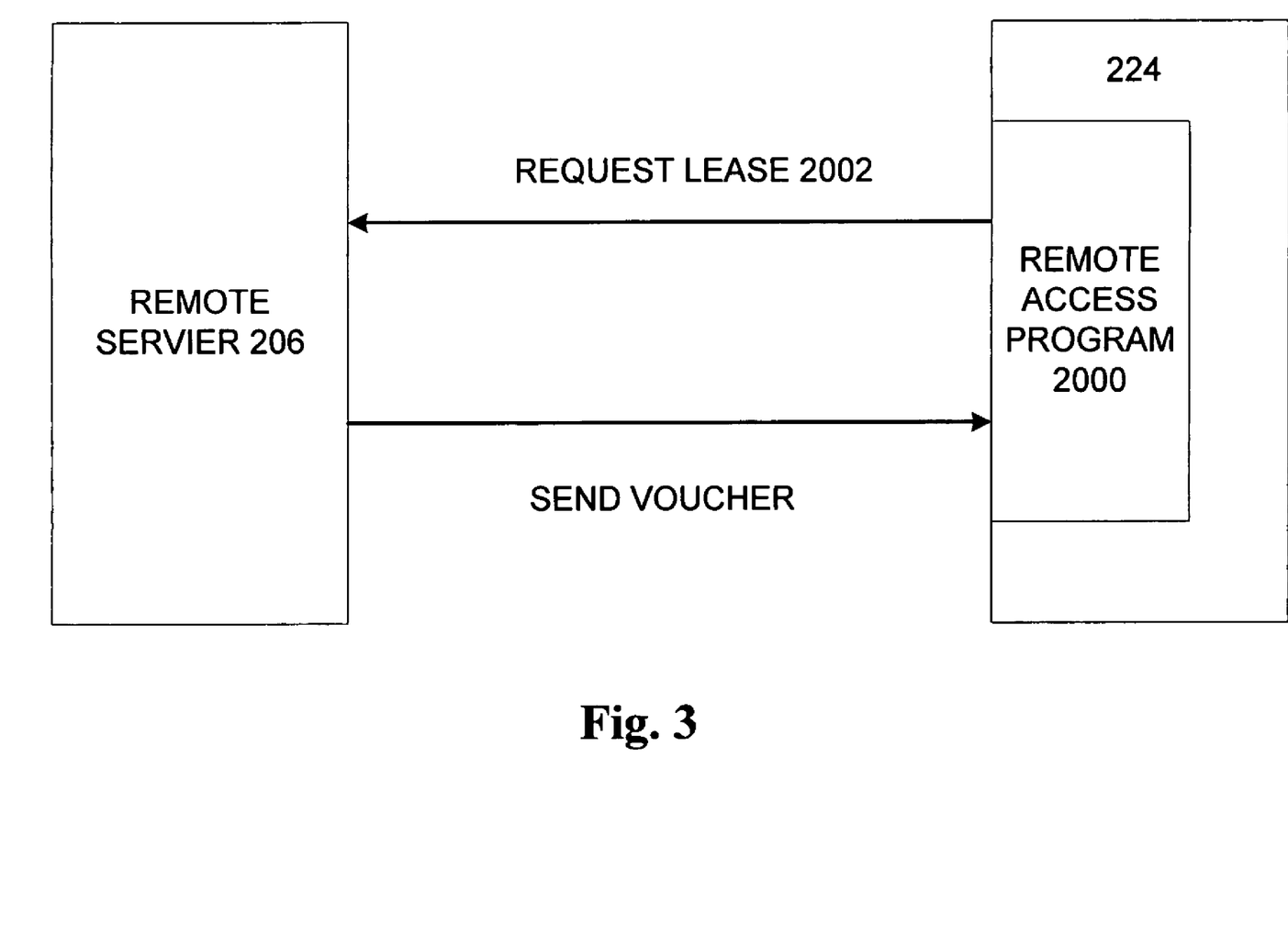
FIG. 3 is a block diagram illustrating a detailed system configuration and functions associated with leasing of keys.

Another embodiment of the invention is shown with respect to FIG. 3, in which a viewing tool 304 is a laptop, PDA or other device that communicates with a remote server 306 via a non-bidirectional protocol." The embodiment discussed herein is a wireless pathways. However, the invention is not so limited, and included protocols over wire pathways and combinations of wireless and wire pathways as well.

An encryption key that is unique to viewing tool 304 is installed on both viewing tool 304 and policy server 306. In this context, an encryption key that is "unique to viewing tool" means that each particular viewing tool 304 has its own key different from the key of any other particular viewing tool 304. The key may be known or unknown to the user of viewing tool 304.

Viewing tool 304 includes a client application 305, which may be an independent program or a plug-in to another program running on viewing tool 304. Client application 305 identifies protected information and interacts with other components to obtain the necessary information needed to unlock and access protected information. It also collects user authentication information, decrypts sensitive information, and controls what can be done with that information while it is being viewed or accessed.

Remote server 306 stores policies and keys, and is responsible for verifying a user's authentication information, determining a user's rights to a given piece of information and packaging up the information in a format that the client application 305 can access. Remote server 306 also stores encryption keys for protected information. The protected information could be stored on remote server 306, but preferably is resident on a different server (not shown in FIG. 3). The policies and/or keys could be stored in such a way that it could only be accessed by a specific client application 305 on a specific viewing tool 304 by a specific user.

A gateway 307 receives requests from client application 305 to access a piece of protected information, forwards that request to remote server 306, receives the responsive information, and forwards the same to client application 305 in a suitable format for viewing tool 304. Gateway 307 is shown in FIG. 3 as separate from remote server 306, but the two could be part of an integral unit. In the alternative, the policy, key authentication, authorizations and/or gateway functions could be in a single server or dispersed over several servers.

An authentication server 308 authenticates user requests and makes policy decisions about who should be allowed access to which pieces of information.

The above embodiment operates as follows. Viewing tool 304 receives, through known methods, protected information. The protected information is encrypted, for which the corresponding encryption key is stored on policy server 306. When the user tries to access protected information, client application 305 recognizes the information as protected, such that viewing tool 304 preferably prompts the user to authenticate in some way (such as requesting a username and password). When the appropriate data is entered, viewing tool 304 sends the user authentication data, along with the data associated with the protected information (e.g., all of the protected information, some of the protected information, an identifier of the protected information, or combinations thereof) to gateway 307. For additional protection, the authentication information can be encrypted using the device-unique key and/or some algorithm also known to the policy server. This information is sent using known wireless connections, for example, a switched message network.

Gateway 307 receives the information, extracts the appropriate information and forwards it to the policy server 306. Gateway 307 can verify the user authentication information (if it can gain access to it in a decrypted form) or it can defer this operation to policy server 306.

Policy server 306 verifies the user authentication information (unless this operation was handled by the gateway). If the authentication is encrypted, policy server 306 uses its knowledge of the device-unique encryption and/or other information and algorithm knowledge to decrypt it. Policy server 306 then coordinates with authentication server 308 to determine whether the particular user is authorized to view the particular protected information in question. If so, policy server 306 creates a voucher by bundling the information encryption key, along with use any policy constraints and/or validity period. Examples of policy constraints include limitations on how the information can be used (e.g., printed) or the validity period. Policy server 306 then encrypts the voucher using the device-unique key and/or some algorithm also known to client application 305 on viewing tool 304. The algorithm will typically include something unique to the user, such as their authentication information, to ensure that it cannot be accessed by another user.

Policy server 306 forwards the voucher back to gateway 307. Gateway 307 in turn delivers the voucher to viewing tool 304 over the switched message network using known connections.

Client application 305 recognizes the delivery of this voucher, reproduces the key needed to decrypt it, and extracts the information encryption key and policy constraints. If the policy constraints are met, then client application 305 decrypts the protected information, and displays it to the user. While the information is decrypted client application 305 limits what can be done with the information based on the constraints identified in the voucher.

The voucher is stored locally on viewing tool 304 until its validity period expires. The user can continue to access the protected information during the validity period subject to the policy constraints. If the user tries to access the protected information after expiration of the validity period, then the user will have to repeat the above methodology to obtain a new voucher.

One or more preferred embodiments have been described to illustrate the invention(s). Additions, modifications, and/or omissions may be made to the preferred embodiment(s) without departing from the scope or spirit of the invention(s). It is the intent that the following claims encompass all such additions, modifications, and/or variations to the fullest extent permitted by law.

By way of example, in the above embodiment, viewing tool 304 forwards at least the user identification data, viewing tool identification data, and protected information identification data. However, the invention is not so limited. Not all of the three types of data need be sent, nor all of the data in a particular class. Other data may also be sent. By way of non-limiting example, viewing tool 304 could authenticate the user locally, such that it would not be necessary to forward authentication data on to the remote server 306.

In another alternative, instead of sending an encryption key for the protected information, policy server 306 could decrypt the protected information directly and forward the decrypted protected information to the user.

In another alternative, depending on the operational and communication model of viewing tool 304, it may be necessary to repackage the original protected information to make it appropriate for viewing tool 304 to be able to decrypt it. For example, with Blackberry devices, protected e-mail attachments are not initially sent to the device.

Rather the message body is sent to the device with a reference to the attachment being held back on a server. In this case the gateway may need to create a message that includes both the voucher and the protected attachment in such a way that it is all delivered to the Blackberry device.

In yet another alternative, the various utilities discussed herein may be in separate devices, or the same devices. The functionality of one or more utilities may be independent from each other or her integrated with each other in various combinations.

What is claimed is:

1. A method of controlling distribution of electronic information to a user device through a non-bidirectional communication protocol, comprising:
   retrieving, at a user device, a segment of encrypted electronic information;
   first sending identification data from the user device to a gateway using the non-bidirectional communication protocol, the identification information including at least one of information associated with a user, information associated with the user device, or information associated with the segment of encrypted electronic information;
   first extracting at the gateway the identification data from said first sending;
   first forwarding the identification data from the gateway based on a bi-directional protocol;
   retrieving an encryption key for the segment;
   second forwarding a voucher to the gateway using the bi-directional protocol;
   second extracting the voucher from said forwarding;
   second sending the voucher to the user device using said a non-bidirectional communication protocol, the voucher including at least the encryption key associated with the segment; and
   decrypting, at the user device, the segment using the encryption key for the segment.

2. The method of claim 1, further comprising:
   encrypting, before said second forwarding, the voucher using an encryption key that is unique to at least one of the user device or the user.

3. The method of claim 2, further comprising:
   decrypting, at the user device, the voucher using the encryption key that is unique to at least one of the user device or the user, to thereby access the encryption key for the segment.

4. The method of claim 1, wherein the voucher includes at least one policy constraint.

5. The method of claim 1, wherein the voucher includes at least a validity period.

6. The method of claim 5, wherein the voucher expires after the validity period.

7. The method of claim 1, further comprising defending said encryption key at said user device.

8. A method of controlling distribution of electronic information, comprising:
   receiving identification information transmitted via a non-bidirectional communication protocol and then a bidirectional protocol, the identification information including at least information associated with a user, a user device, and a segment of encrypted electronic information;
   retrieving an encryption key for the segment;
   preparing a voucher, the voucher including at least an encryption key for decrypting the segment, and a validity period;
   encrypting the voucher using a key specific to at least the user device; and
   forwarding the voucher using the bidirectional protocol followed by the non-bidirectional communication protocol.

9. The method of claim 8, wherein said voucher is encrypted with an encryption key that is unique to at least one of a user device or a user.

10. The method of claim 8, wherein the voucher includes at least one policy constraint.

11. The method of claim 8, wherein the voucher includes at least a validity period.

12. The method of claim 11, wherein the voucher expires after the validity period.

13. A system for controlling distribution of electronic information to a user device through a non-bidirectional communications protocol, comprising:
   said user device being configured to access a segment of encrypted electronic information and to send identification data to a gateway using the non-bidirectional communications protocol, the identification information including at least one of information associated with a user, information associated with the user device, or information associated with the segment of encrypted electronic information;
   a remote site including at least one server configured to retrieving a copy of an encryption key for the segment and forward a voucher to the gateway using a bidirectional communications protocol, wherein the voucher includes at least the encryption key associated with the segment;
   the gateway being configured to receive the identification data from the user device using the non-bidirectional protocol and forward the identification data to the remote site using the bidirectional protocol, and to receive the voucher from the remote site using the bidirectional protocol and to forward the voucher to the user device using the non-bidirectional protocol; and
   said user device being configured to receive said voucher and decrypt the segment using the encryption key for the segment.

14. The system of claim 13, further comprising said at least one server being configured to encrypt the voucher using an encryption key that is unique to at least one of said user device or a specific user.

15. The system of claim 14, further comprising said user device being configured to decrypt the voucher using the encryption key that is unique to at least one of the user device or the user, to thereby access the encryption key for the segment.

16. The method of claim 13, wherein said voucher includes at least one policy constraint.

17. The method of claim 13, wherein said voucher includes a validity period.

18. The method of claim 17, wherein said voucher expires after the validity period.

19. The system of claim 13, further comprising said user device being capable of defending said encryption key at said user device.

20. A system of controlling distribution of electronic information, comprising:
   at least one server configured to:
      receive identification information sent using a non-bidirectional communications protocol followed by using a bidirectional protocol, the identification information including at least information associated with a user, a user device, and a segment of encrypted electronic information;
      retrieve a copy of an encryption key for the segment;
      prepare a voucher that includes at least an encryption key for decrypting the segment and a validity period;
      encrypt the voucher using a key specific to at least the user device; and
      forward the voucher using the bidirectional protocol followed by using the non-bidirectional communications protocol.

21. The method of claim 20, wherein said voucher is encrypted with an encryption key that is unique to at least one of a user device or a user.

22. The method of claim 20, wherein said voucher includes at least one policy constraint.

23. The method of claim 20, wherein said voucher includes a validity period.

24. The method of claim 23, wherein said voucher expires after said validity period.

* * * * *